United States Patent
Hu et al.

(10) Patent No.: US 9,076,760 B2
(45) Date of Patent: Jul. 7, 2015

(54) JFET HAVING WIDTH DEFINED BY TRENCH ISOLATION

(75) Inventors: Binghua Hu, Plano, TX (US); Pinghai Hao, Plano, TX (US); Sameer Pendharkar, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 242 days.

(21) Appl. No.: 13/597,439

(22) Filed: Aug. 29, 2012

(65) Prior Publication Data

US 2014/0062524 A1 Mar. 6, 2014

(51) Int. Cl.
*G01R 31/26* (2014.01)
*H01L 29/417* (2006.01)
*H01L 21/00* (2006.01)
*H01L 29/423* (2006.01)
*H01L 29/808* (2006.01)
*H01L 29/06* (2006.01)
*H01L 29/10* (2006.01)

(52) U.S. Cl.
CPC .......... *H01L 29/41725* (2013.01); *H01L 21/00* (2013.01); *G06F 2101/00* (2013.01); *G06F 2201/00* (2013.01); *H01L 29/42316* (2013.01); *H01L 29/808* (2013.01); *H01L 29/0692* (2013.01); *H01L 29/1066* (2013.01)

(58) Field of Classification Search
CPC . H01L 21/00; H01L 2021/00; H01L 2221/00; H01L 2223/00; H01L 2924/00; H01L 2925/00; G06F 1/00; G06F 2003/00; G06F 2101/00; G06F 2200/00; G06F 2201/00
USPC .................................................. 324/762.09
See application file for complete search history.

(56) References Cited

U.S. PATENT DOCUMENTS

| | | | |
|---|---|---|---|
| 5,122,851 A | 6/1992 | Solomon | |
| 6,225,674 B1 * | 5/2001 | Lim et al. | 257/506 |
| 6,530,068 B1 * | 3/2003 | Cao et al. | 716/106 |
| 7,741,661 B2 * | 6/2010 | Disney et al. | 257/272 |
| 2005/0023606 A1 * | 2/2005 | Williams et al. | 257/328 |
| 2006/0071247 A1 | 4/2006 | Chen et al. | |
| 2008/0197445 A1 * | 8/2008 | Disney et al. | 257/506 |
| 2008/0230812 A1 | 9/2008 | Disney et al. | |
| 2008/0237656 A1 | 10/2008 | Williams et al. | |
| 2008/0237704 A1 * | 10/2008 | Williams et al. | 257/338 |
| 2008/0272395 A1 | 11/2008 | Banna | |
| 2010/0032731 A1 | 2/2010 | Babcock et al. | |
| 2010/0035421 A1 * | 2/2010 | Denison et al. | 438/514 |

* cited by examiner

*Primary Examiner* — Jay Patidar
*Assistant Examiner* — Temilade S Rhodes-Vivour
(74) *Attorney, Agent, or Firm* — Jacqueline J. Garner; Frank Cimino

(57) ABSTRACT

A junction field-effect transistor (JFET) includes a substrate having a first-type semiconductor surface including a topside surface, and a top gate of a second-type formed in the semiconductor surface. A first-type drain and a first-type source are formed on opposing sides of the top gate. A first deep trench isolation region has an inner first trench wall and an outer first trench wall surrounding the top gate, the drain and the source, and extends vertically to a deep trench depth from the topside surface. A second-type sinker formed in semiconductor surface extends laterally outside the outer first trench wall. The sinker extends vertically from the topside surface to a second-type deep portion which is both below the deep trench depth and laterally inside the inner first trench wall to provide a bottom gate.

17 Claims, 4 Drawing Sheets

JFET HAVING WIDTH DEFINED BY TRENCH ISOLATION

FIELD

Disclosed embodiments relate to junction field-effect transistors (JFETs).

BACKGROUND

A JFET is the simplest type of field-effect transistor (FET). In operation, to pinchoff the normally conducting channel of a JFET, a certain minimum gate-to-source reverse bias ($V_{GS}$) is applied to the gate and source junction. JFETs can include a heavily doped vertical sinker coupled to a bottom (or back) gate to improve performance of the JFET, including a lower pinchoff voltage and faster switching.

SUMMARY

Disclosed embodiments include junction field-effect transistors (JFETs) having a width defined by an enclosing trench isolation region referred to herein as the "first deep trench isolation region". The JFET includes a substrate having a first-type semiconductor surface including a topside surface, and a top gate of a second-type formed in the semiconductor surface. A first-type drain and a first-type source are formed on opposing sides of the top gate. As used herein, the "first-type" and "second-type" refer to the doping type, where one of the types has n-type doping and the other type has p-type doping.

The first deep trench isolation region has an inner first trench wall and an outer first trench wall surrounding the top gate, the drain and the source, and extends vertically a deep trench depth from the topside surface. A second-type sinker formed in semiconductor surface includes a portion which extends laterally outside the outer first trench wall. The sinker extends vertically from the topside surface to a second-type deep portion which is both below the deep trench depth and extends laterally inside the inner first trench wall to provide a bottom gate for the JFET.

Disclosed JFETs can be used as a high voltage tolerant JFET in ICs, such as for analog ICs, and for non-destructive process monitoring purposes on an IC. Monitoring embodiments include monitoring the deep trench depth and the extent (length) of the lateral diffusion of the bottom gate out from the inner first trench wall.

BRIEF DESCRIPTION OF THE DRAWINGS

Reference will now be made to the accompanying drawings, which are not necessarily drawn to scale, wherein:

FIG. 1A is a depth enhanced top view depiction of an example JFET, while

DETAILED DESCRIPTION

Figure 1A:
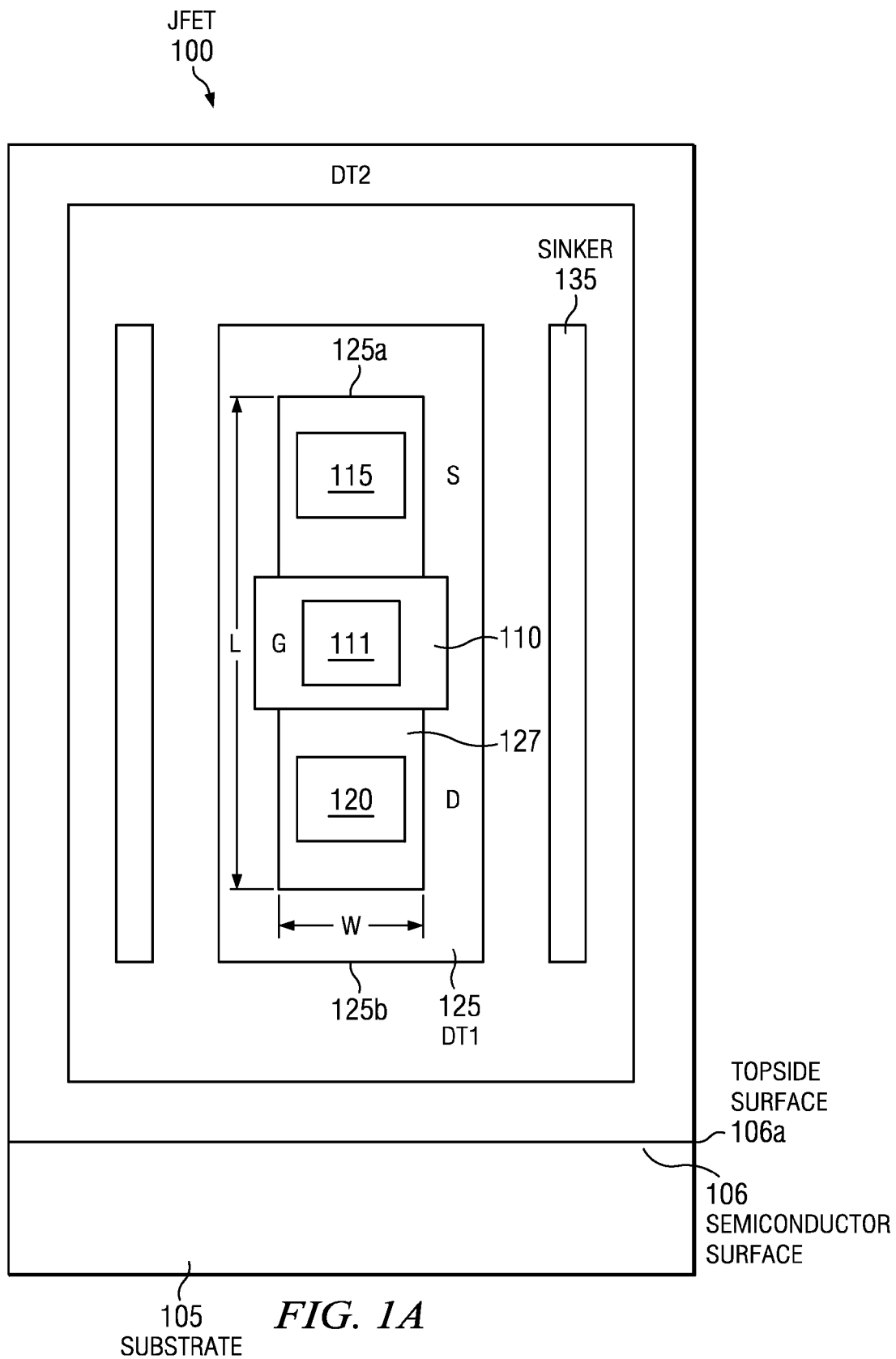

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Figure 1B:
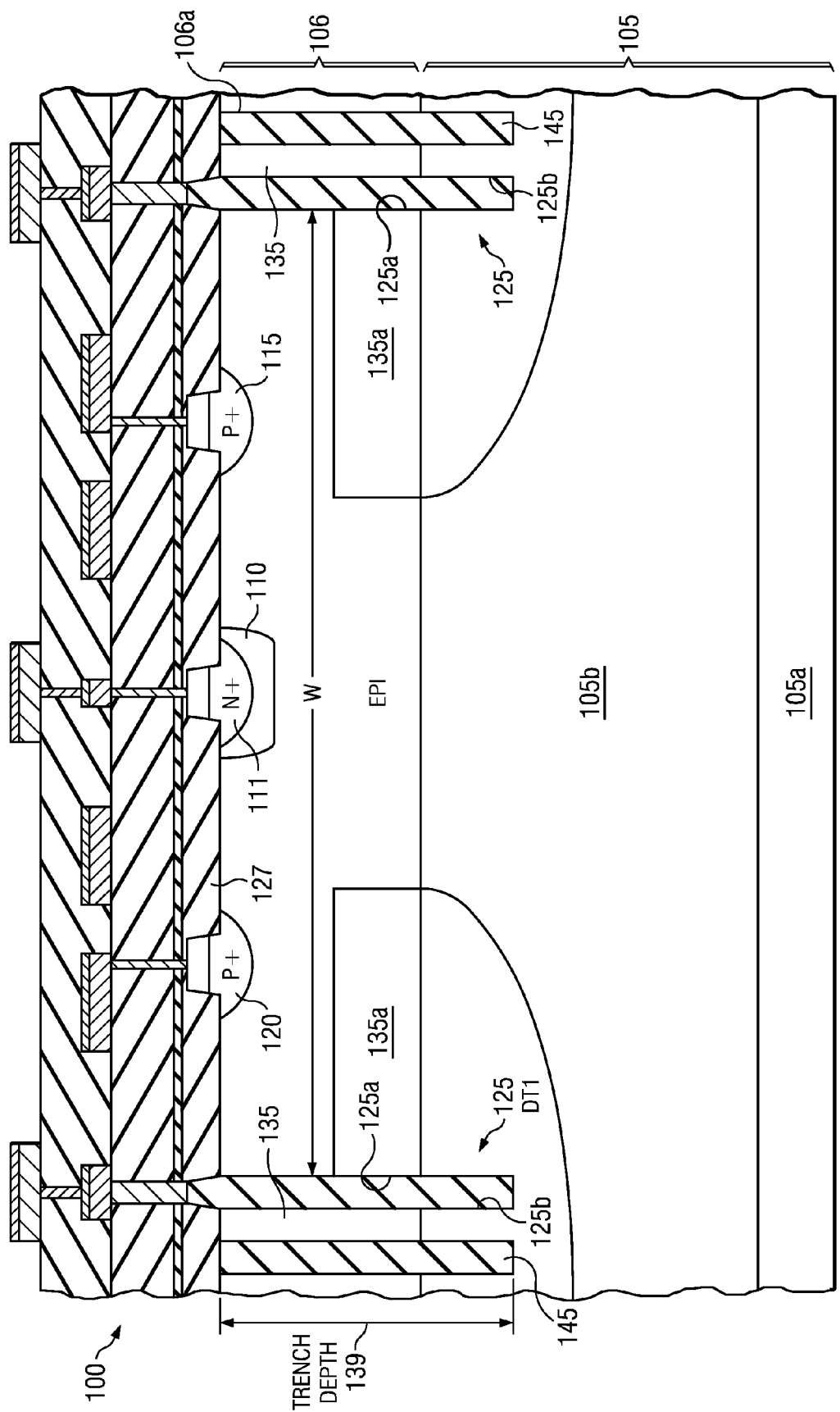
FIG. 1B is a cross-sectional depiction of the JFET depicted in FIG. 1A, according to an example embodiment.

FIG. 1A is a depth enhanced top view depiction of an example JFET 100 described as a p-JFET 100, while FIG. 1B is a cross-sectional depiction of the JFET 100 depicted in FIG. 1A, according to an example embodiment. When JFET 100 is a p-JFET 100, first dopant type (the dopant type for the substrate surface and channel, source and drain) is p-type and the second dopant type (for the gate) is n-type. JFET 100 embodied as a p-JFET comprises a substrate 105 having a p-type semiconductor surface 106 including a topside surface 106a. When the JFET 100 comprises an n-JFET, the dopant types are simply reversed relative to a p-JFET.

The substrate 105 can comprise a bulk substrate, or include an epitaxial layer on a substrate. The substrate 105 can comprise silicon, silicon-germanium, or other substrate that provides a semiconductor surface 106.

Trench isolation 127 can comprise trench isolation such as shallow trench isolation (STI), or local oxidation (LOCOS). The top gate 110 shown comprises a n-type diffusion (n-well) formed in the semiconductor surface 106, having an n+ contact 111 inside the top gate 110.

A drain 120 and source 115 both p+ doped for a p-JFET are formed on opposing sides of the top gate 110 in the semiconductor surface 106. A first trench isolation region referred to herein as a first deep trench isolation (DT1) 125 includes an inner first trench wall 125a and an outer first trench wall 125b. DT1 125 is configured to enclose (or surround) the top gate 110, drain 120 and source 115, and extend vertically from the topside surface 106a to a deep trench depth 139 as shown in FIG. 1B, such as from 1.5 μm to 4 μm. The width of the JFET 100 shown as W is the space between the inner first trench walls 125a as shown in the x-direction. The length of the JFET 100 shown as L is also defined by the space between the inner first trench walls 125a as shown in the y-direction. DT1 125 thus defines the area of the JFET 100.

A sinker 135 doped n+ for the p-JFET is formed in semiconductor surface 106 laterally outside the outer first trench wall 125b. As shown in FIG. 1B the sinker 135 extends vertically from the topside surface 106a, and due to a high temperature diffusion (e.g., 1100° C. to 1200° C. drive) during processing diffuses out from the bottom of the DT1 125 into the semiconductor surface 106 to provide a second-type deep portion (bottom gate) 135a being n+ doped for the p-JFET, which is both below the deep trench depth 139 of the DT1 125 and laterally inside the inner first trench wall 125a.

An optional second deep trench isolation region 145 is shown positioned laterally outside the outer first trench wall 125b which also extends vertically to the trench depth 139. The sinker 135 is thus between the outer first trench wall 125b and the second deep trench isolation region 145. JFET 100 may be used for high voltage applications, such as for a 20 to 40 V application, and can be implemented in a trench isolated analog or Bipolar CMOS DMOS (BCD) process generally without any extra masks.

In FIG. 1B the substrate 105 is shown comprising a portion 105a doped p-type having a buried layer 105b doped n-type thereon for a p-JFET. The semiconductor surface 106 is shown as an epitaxial (epi) layer. There is an electrical contact shown to DT1 125. Although not shown, the DT1 125 can have a polysilicon filled center region which allows electrical contact thereto for optional biasing of DT1 125. Although there is an electrical contact provided to sinker 135 to provide contact to the bottom gate 135a, for simplicity, no contact is shown in FIG. 1A or FIG. 1B.

Figure 2:
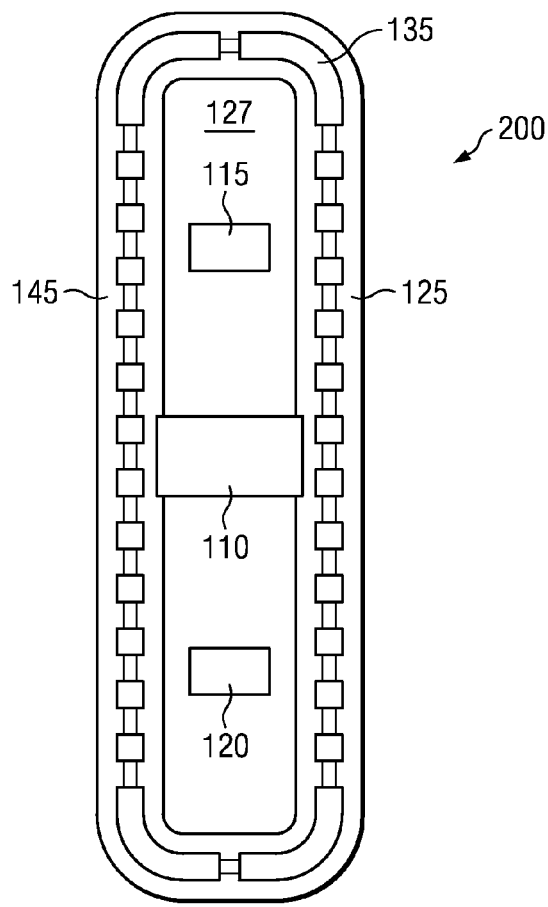
FIG. 2 is a top view depiction of an example JFET having a bottom gate configured in a checkerboard layout, according to an example embodiment.

FIG. 2 is a top view depiction of an example JFET 200 having a sinker 135 in a checkerboard layout, according to an example embodiment. Having the sinker 135 in a checkerboard layout provides a checkerboard patterned bottom gate 135a after its formation following high temperature diffusion. The pinchoff voltage of the JFET 200 can be tuned by varying the layout pattern of the sinker 135 which then effects the layout of the bottom gate 135a. If the sinker 135 is discontinuous, such as in a checkerboard layout, the amount of lateral diffusion of the bottom gate 135a will be reduced as compared to as continuous sinker 135 resulting in less diffusion to form the bottom gate 135a, which will function to raise the |pinchoff voltage| of the JFET.

As noted above, besides being useful as JFETs within the functional circuitry on ICs, such as for performing the switching function, disclosed JFETs can also be used for non-destructive process monitoring. In one embodiment, described for p-JFETs, disclosed JFETs can be used to electrically monitor the extent (length) of lateral diffusion (length) of the bottom gate 135a measured from the inner first trench wall 125a. Known spreadsheet resistance measurements cannot provide the length of lateral diffusion of the bottom gate 135a from the inner first trench wall 125a.

In one embodiment, the source to drain current, is used to estimate the length of the lateral diffusion of the bottom gate 135a from the inner first trench wall 125a. A relatively low voltage (e.g., <|0.5V|), can be used so that there is minimal depletion effects. The source to drain current decreases as the length of lateral diffusion of the bottom gate 135a from the inner first trench wall 125a increases, and the Inventors have recognized when two (2) times the lateral diffusion length approaches the width (W) of the JFET (as noted above W of the JFET 100 is the space between the inner first trench walls 125a of DT1 125 in the x-direction), pinchoff occurs (the bottom gate 135a shorts to the top gate 110), and as a result the source to drain current is reduced several orders of magnitude from its pre-pinchoff value (where a current path is present between source and drain) to a very low level. For example, FIG. 3 described below shows a p-JFET having a W of 4 µm pinches off when the lateral diffusion length is larger than 1.5 µm.

As known in the art, Bvdss for a JFET refers to the breakdown voltage (defined at some predetermined current level, such as at 1 µa) between the drain and the source terminals, when the gate and the source terminals are shorted together. The Bvdss value is generally between 20 and 50 volts. The Inventors have recognized for a given W, Bvdss decreases as the length of lateral diffusion of the bottom gate 135a from the inner first trench wall 125a increases.

A calibration relation between source to drain current or Bvdss for a disclosed JFET as a function of length of the lateral diffusion of the bottom gate 135a from the inner first trench wall 125a can be generated at a predetermined set of conditions including a bias condition. Empirical data is one way to generate this data, although simulation is also possible. For example, for the source to drain current embodiment, for an expected range of lateral diffusion of 1.5 to 2.5 µm, a plurality of disclosed JFETs having different W's can be provided, such as 2, 3, 4, 5 and 6 µm, and these devices are all measured after metallization. If the JFETs having W's of 2, 3 and 4 µm all have low source to drain current, while the JFETs having W's of 5 µm and 6 µm have high source to drain current, it can be concluded that the lateral diffusion of the bottom gate 135a from the inner first trench wall 125a in the final IC is from 1.5 µm to 2.0 µm.

Figure 3:
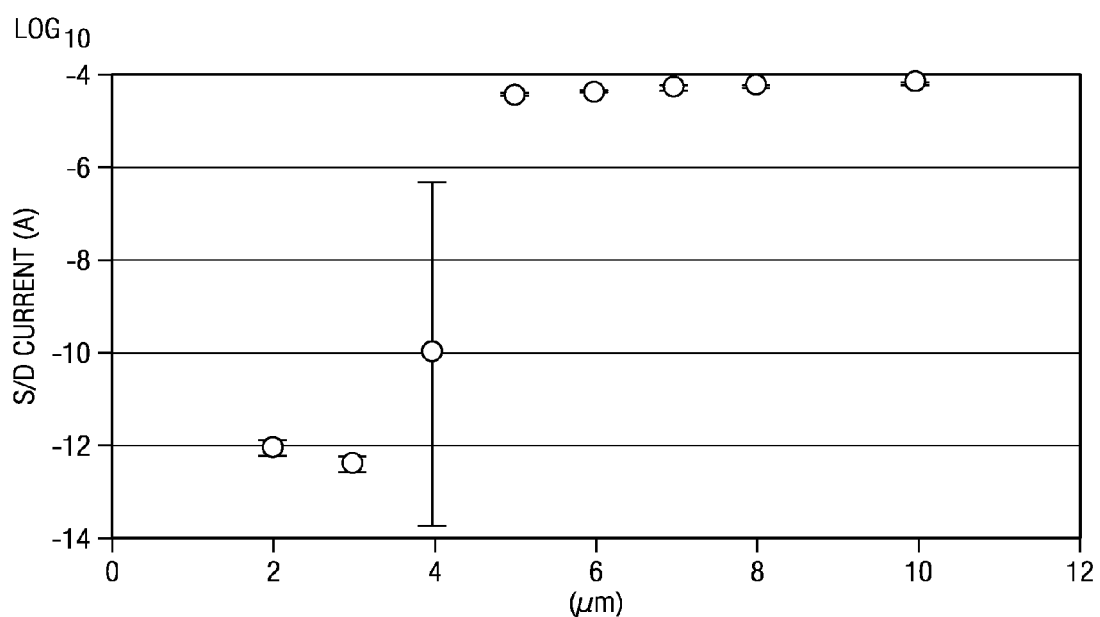
FIG. 3 shows an example relation for drain to source current vs. JFET width (W) in μm that can be used to estimate the lateral diffusion of the deep n+ (for a p-JFET) or deep p+ (for an n-JFET) from the inner first trench wall that provides the bottom gate for the JFET, according to an example embodiment.

For example, FIG. 3 shows an example relation for drain to source current vs. JFET W for a p-JFET (in µm). The discontinuity in current at about W=4 µm indicates the lateral diffusion of the bottom gate 135a from the inner first trench wall 125a is a bit larger than 1.5 µm. For W<4 µm, the drain to source current decreases abruptly (due to no longer a drain to source current path), since two times the lateral diffusion of the bottom gate 135a from the inner first trench wall 125a is about 3.5 µm to 4 µm.

In another monitoring embodiment, described for p-JFETs, a disclosed JFET can be used to electrically monitor the deep trench depth 139 of a deep trench. There is no inline tool or method available for monitoring deep trench depth known in the art. SEM cross-section analysis is the only known way to characterize deep trench depth, but is a destructive and time consuming process. This embodiment is based on the Inventor's recognition the breakdown voltage of the bottom gate 135a to the semiconductor surface 106 shown as epi in FIG. 1B correlates with the deep trench depth, because the curvature of bottom gate 135a near bottom of the DT1 125 increases with increasing deep trench depth. As known in device physics, junction curvatures enhance the electric field in the curved parts of the associated depletion regions, and the enhanced electric field reduces the breakdown voltage below that predicted by one-dimensional junction theory.

Calibration data for the breakdown voltage from the bottom gate 135a to the semiconductor surface 106 shown as epi in FIG. 1B as a function of deep trench depth can be obtained by obtaining breakdown voltage on test JFETs, and then directly measuring the corresponding deep trench depth, such as using SEM cross section analysis. This allows a calibration relation to be generated and stored. Upon completion of the process steps to form an IC including metallization, the breakdown voltage from the bottom gate 135a to the semiconductor surface 106 can be measured, and the calibration relation used to determine the deep trench depth. The deep trench depth can thus be estimated electrically and statistical results can be obtained by using a plurality of JFETs. For example, by placement of disclosed JFETs spread across the area of a wafer, a full wafer map can be obtained to evaluate deep trench depth uniformity across the wafer.

Figure 4:
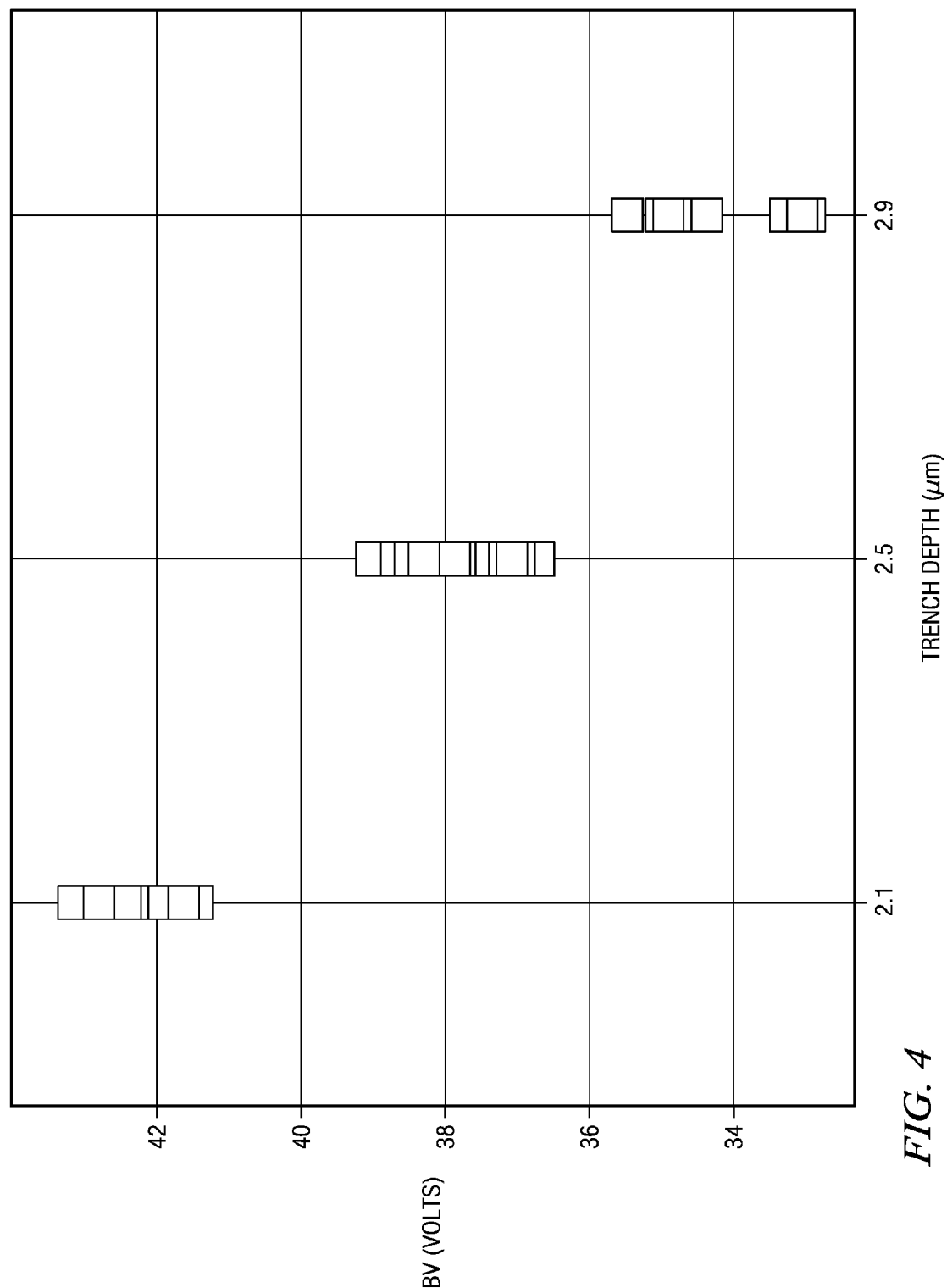
FIG. 4 shows a plot of diode breakdown voltage from an n+ bottom gate to the p-semiconductor surface vs. trench depth (in μm) for a p-JFET that can be used to monitor the trench depth, according to an example embodiment.

FIG. 4 shows a plot of diode breakdown voltage from the bottom gate 135a doped n+ to the semiconductor surface 106 doped p− vs. trench depth (in µm) for a p-JFET. The breakdown voltage can be seen to decrease from about 42 V to about 34V as the trench depth increases from 2.1 µm to 2.9 µm, since the curvature of bottom gate 135a near bottom of the DT1 125 increases with increasing trench depth.

Disclosed embodiments can be integrated into a variety of assembly flows to form a variety of different semiconductor integrated circuit (IC) devices and related products. The assembly can comprise single semiconductor die or multiple semiconductor die, such as PoP configurations comprising a plurality of stacked semiconductor die. A variety of package substrates may be used. The semiconductor die may include various elements therein and/or layers thereon, including barrier layers, dielectric layers, device structures, active elements and passive elements including source regions, drain regions, bit lines, bases, emitters, collectors, conductive lines, conductive vias, etc. Moreover, the semiconductor die can be formed from a variety of processes including bipolar, CMOS, DMOS, BiCMOS and MEMS.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

We claim:

1. A junction field-effect transistor (JFET), comprising:
    a substrate having a first-type semiconductor surface (semiconductor surface) including a topside surface;
    a top gate comprising a second-type formed in said semiconductor surface;
    a first-type drain and a first-type source formed on opposing sides of said top gate in said semiconductor surface;
    a first deep trench isolation region having an inner first trench wall and an outer first trench wall surrounding said top gate, said drain and said source and extending vertically to a deep trench depth from said topside surface;
    a second-type sinker formed in said semiconductor surface laterally outside said outer first trench wall, said sinker extending vertically from said topside surface to a second-type deep portion which is both below said deep trench depth and extends laterally inside said inner first trench wall to provide a bottom gate.

2. The JFET of claim 1, further comprising a second deep trench isolation region positioned laterally outside said outer first trench wall extending vertically to said deep trench depth, wherein said sinker is between said outer first trench wall said second deep trench isolation region.

3. The JFET of claim 1, wherein said deep portion is in a discontinuous pattern.

4. The JFET of claim 1, wherein said JFET comprises a p-JFET.

5. The JFET of claim 1, wherein said JFET comprises an n-JFET.

6. The JFET of claim 1, further comprising shallow trench isolation (STI) within said inner first trench wall surrounding said top gate, said source, and said drain.

7. A method of forming a junction field-effect transistor (JFET), comprising:
    providing a substrate having a first-type semiconductor surface (semiconductor surface) including a topside surface;
    forming a top gate comprising a second-type in said semiconductor surface;
    forming a first-type drain and a first-type source on opposing sides of said top gate in said semiconductor surface;
    forming a first deep trench isolation region having an inner first trench wall and an outer first trench wall surrounding said top gate, said drain and said source and extending vertically to a deep trench depth from said topside surface, and
    forming a second-type sinker in said semiconductor surface laterally outside said outer first trench wall, said sinker extending vertically from said topside surface to a second-type deep portion which is both below said deep trench depth and laterally inside said inner first trench wall to provide a bottom gate.

8. The method of claim 7, wherein said deep portion is in a discontinuous pattern.

9. The method of claim 7, further comprising forming a second deep trench isolation region positioned laterally outside said outer first trench wall extending vertically to said deep trench depth, wherein said sinker is between said outer first trench wall and said second deep trench isolation region.

10. The method of claim 7, wherein said JFET comprises a p-JFET.

11. The method of claim 7, wherein said JFET comprises an n-JFET.

12. The method of claim 7, further comprising forming shallow trench isolation (STI) within said inner first trench wall, wherein said STI surrounds said top gate, said source, and said drain.

13. A method of using junction field-effect transistors (JFETs) to determine a lateral diffusion length out from trench isolation, comprising:
    measuring electrical data comprising current from a source to a drain (source to drain current) or a breakdown voltage between said drain and said source (Bvdss) for at least one JFET formed on an integrated circuit (IC) including a substrate having a first-type semiconductor surface (semiconductor surface) including a topside surface, said JFET including:
        a top gate comprising a second-type formed in said semiconductor surface;
        said source and said drain being first-type formed on opposing sides of said top gate in said semiconductor surface;
        a first deep trench isolation region having an inner first trench wall and an outer first trench wall surrounding said top gate, said source and said drain and extending vertically a deep trench depth from said topside surface;
        a second-type sinker formed in said semiconductor surface laterally outside said outer first trench wall, said sinker extending vertically from said topside surface to a second-type deep portion which is both below said deep trench depth and extends laterally inside said inner first trench wall to provide a bottom gate, and
    determining a length of a lateral diffusion of said bottom gate relative to said inner first trench wall from said electrical data using stored characterization data.

14. The method of claim 13, wherein said electrical data comprises said source to drain current and said stored characterization data comprises said source to drain current as a function of spacing between said inner first trench wall which defines a width for said JFET.

15. The method of claim 13, wherein said electrical data comprises said Bvdss and said stored characterization data comprises said Bvdss versus said length of said lateral diffusion of said bottom gate relative to said inner first trench wall.

16. A method of using junction field-effect transistors (JFETs) to monitor trench depth, comprising:
    measuring electrical data comprising a breakdown voltage between a bottom gate and a first-type semiconductor surface (semiconductor surface) for at least one JFET formed on an integrated circuit (IC) including a substrate having said semiconductor surface including a topside surface, said JFET including:
        a top gate comprising a second-type formed in said semiconductor surface;
        a source and a drain being first-type formed on opposing sides of said top gate in said semiconductor surface;
        a first deep trench isolation region having an inner first trench wall and an outer first trench wall surrounding said top gate, said source and said drain extending vertically a deep trench depth from said topside surface;

a second-type sinker formed in said semiconductor surface laterally outside said outer first trench wall, said sinker extending vertically from said topside surface to a second-type deep portion which is both below said deep trench depth and extends laterally inside said inner first trench wall to provide said bottom gate, and determining said deep trench depth using stored characterization data relating said breakdown voltage between said bottom gate and said semiconductor surface and said deep trench depth.

17. The method of claim 16, wherein said substrate comprises a wafer, and wherein said at least one JFET comprises a plurality of said JFETs spread across an area of said wafer, further comprising generating a wafer map which evaluates a uniformity of said deep trench depth across said wafer.

\* \* \* \* \*